Dec. 10, 1935.    E. G. MYERS    2,023,644
MEANS FOR MIXING
Filed Sept. 12, 1933    3 Sheets-Sheet 1

Inventor
Elias G. Myers
By:- Cox & Moore attys

Dec. 10, 1935.　　　　E. G. MYERS　　　　2,023,644
MEANS FOR MIXING
Filed Sept. 12, 1933　　　3 Sheets-Sheet 2

Inventor:
Elias G. Myers
By:- Cox & Moore attys

Dec. 10, 1935.                E. G. MYERS                2,023,644
                            MEANS FOR MIXING
                        Filed Sept. 12, 1933         3 Sheets-Sheet 3
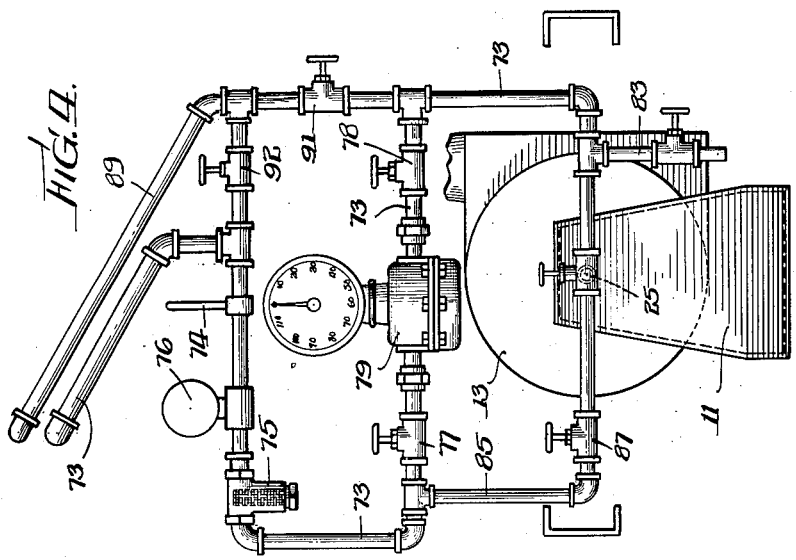
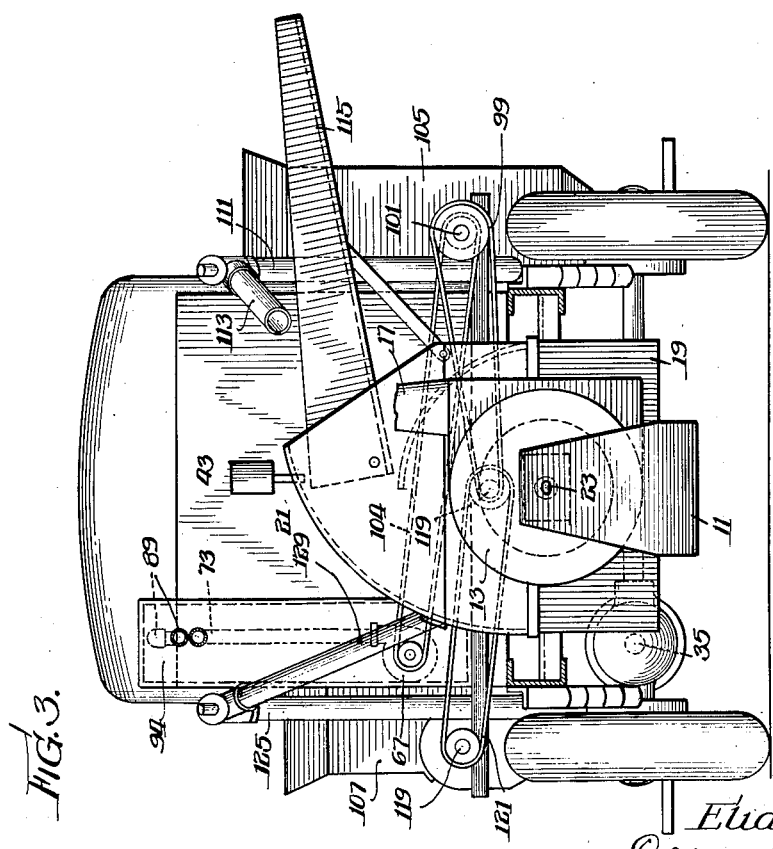
Inventor:
Elias G. Myers,
By:- Cox & Moor attys Patented Dec. 10, 1935

2,023,644

UNITED STATES PATENT OFFICE 2,023,644

MEANS FOR MIXING

Elias G. Myers, Toledo, Ohio, assignor to The Myers-Sherman Company, Chicago, Ill., a corporation of Ohio Application September 12, 1933, Serial No. 689,108

3 Claims. (Cl. 259—1)

My invention relates in general to mixing apparatus and methods, and has more particular reference to means for and methods of mixing feeds more especially the mixing of liquid food ingredients with subdivided solid foodstuffs.

My invention specifically contemplates the provision of a new mode of mixing molasses or other liquid with subdivided edible materials such as ground grain, hay, alfalfa, beans and other vegetable matter such as is or may be used as ingredients in mixed feeds.

Another object is to provide for mixing the liquid ingredient by injecting it under pressure into a stream of the ground material, preferably as delivered from the grinder.

Another object is to provide for controlling the amount of liquid mixed with the ground material.

Another object is to provide for mixing the liquid ingredient uniformly and evenly with the ground material and to carry out the mixing as a continuous process.

Another object is to provide for mixing a plurality of different solid food materials in order to produce the ground material with which the molasses is mixed as a continuous process and for adjustably controlling the quantities of the several ingredients entering the mixture of ground materials.

Another object is to provide a mobile mixing device of the class, upon a truck, preferably a truck having an engine and additionally to utilize the heat generated by the operation of the engine to maintain the liquid ingredient used in the mixing device in a desired state of fluidity for mxing purposes.

Another object is to provide a food-mixing apparatus of the class described driven by a water-cooled engine and to utilize the circulating water to heat the liquid food ingredient in a proper fluid state for use.

Among the other objects and advantages is to inject the liquid ingredient under pressure into the subdivided solid material; to maintain a slight vacuum at the place where the liquid is mixed with the subdivided solid material; to utilize a fan or blower as the mixing device; to introduce a liquid spray into a blower through which the subdivided solid material is being forced so that the actual mixing occurs within the blower casing; and in general to provide a compact, mobile mixing apparatus having the numerous advantages hereinafter specified.

Numerous other objects of the invention will become apparent as the same is more fully understood from the following description, which, taken in connection with the accompanying drawings, discloses a preferred embodiment of the invention.

Referring to the drawings:

Figure 3 is a sectional view taken along the line 3—3 in Figure 1; and

Figure 4 is a view showing the pipe arrangement at the back of the truck for delivering the fluid food ingredient to the mixing chamber.

Figure 1:
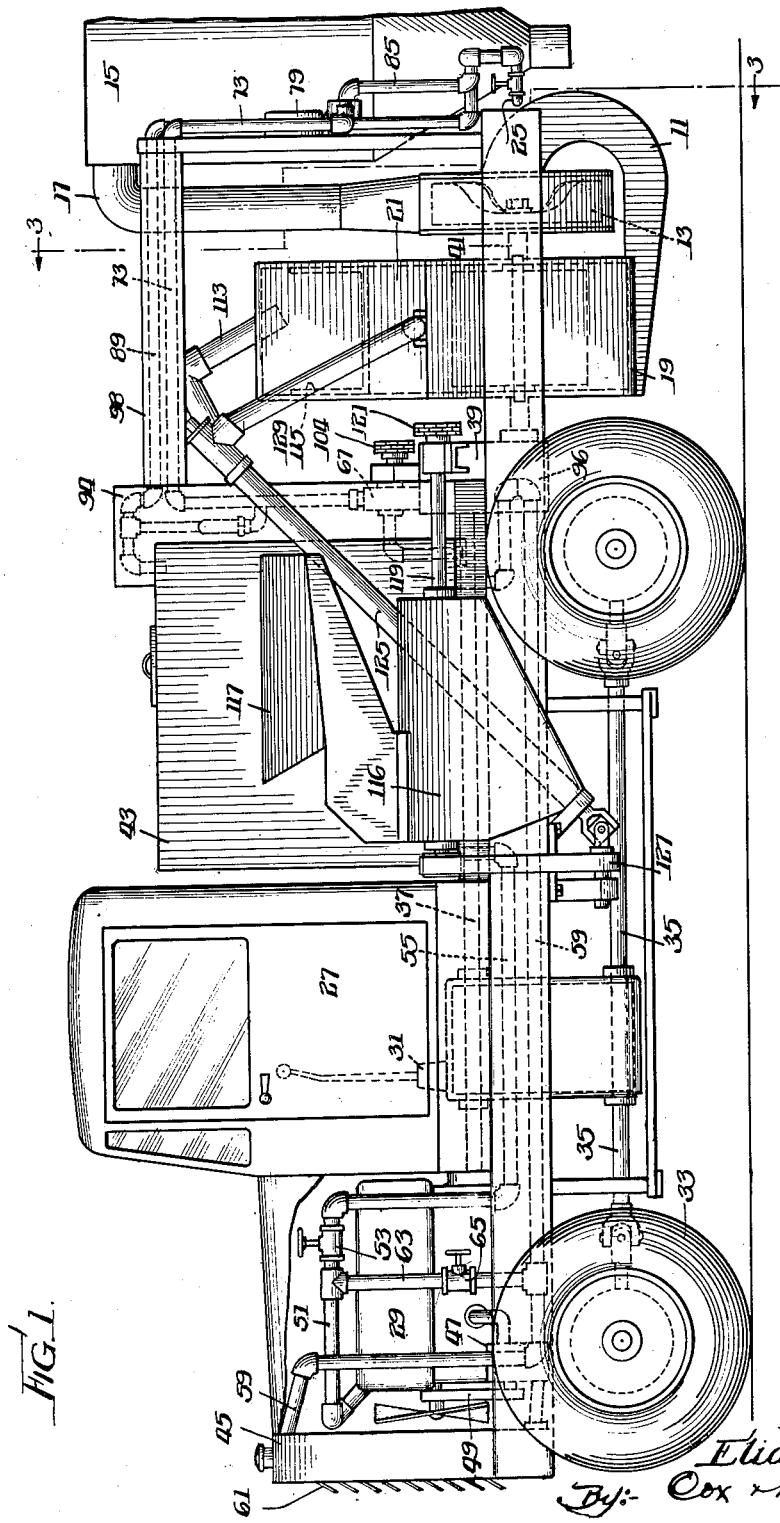
Figure 1 is a side elevation view of a mobile truck carrying mixing apparatus embodying my invention.
Figure 2:
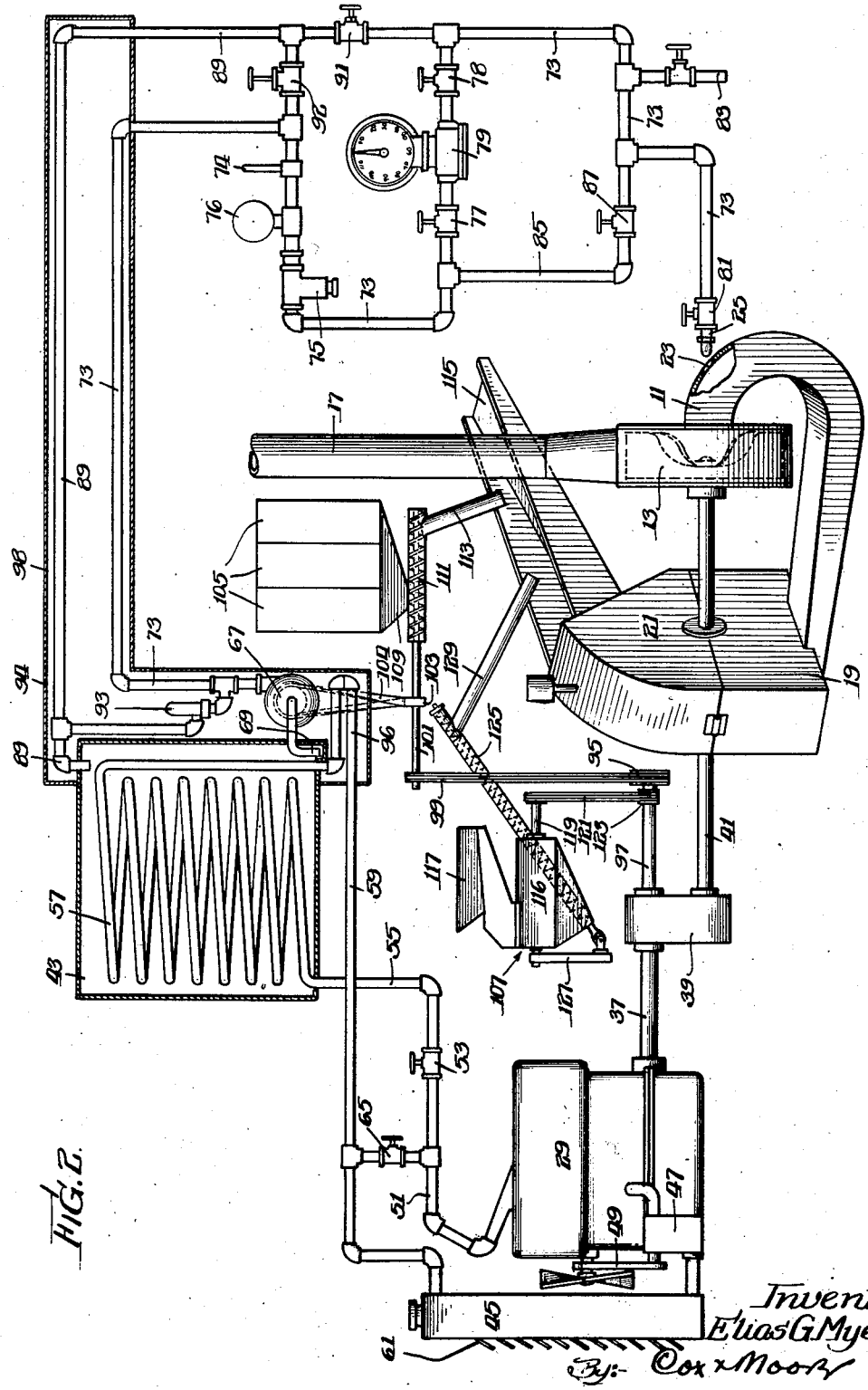
Figure 2 is a diagrammatic representation of the mixing apparatus.

To illustrate my invention, I have shown on the drawings a mixing device including a mixing chamber 11 through which ground material is or may be drawn, or otherwise forced, in the form of a continuous stream by means of the blower 13, and thence be delivered to a collector 15 through a delivery pipe 17.

The mixing chamber, in the illustrated embodiment, comprises a preferably sheet metal casing forming a conduit or chute connected at one end to the outlet of a grinder 19 which, in the illustrated embodiment, is shown as a hammer mill into which grains, corn stalks, hay, and other materials may be delivered through the chute 115. The materials introduced into the grinder through the chute 115 may form the basic ingredients of a feed mixture to which molasses or other fluid is to be mixed. The outlet end of the conduit 11 is connected to the blower 13, which is preferably an air fan connected to create a suction in the mixing chamber to draw subdivided matter therethrough in a continuous stream from the grinder. The walls of the mixing chamber are provided with an opening 23 adjacent the fan and a jet nozzle 25 is mounted opposite the opening in position to spray a fluid, usually molasses, through the opening 23 and into the interior of the mixing chamber in contact with the stream of material traveling through the mixing chamber under the influence of the suction exerted by the fan 13. It will be noted that the spray is directed toward the inlet of the fan 13 and that the actual mixing takes place at least in part within the casing of the fan. Alternatively, the molasses may be sprayed directly into the fan, in which case the mixing takes place entirely within the mixing chamber.

It is also within the contemplation of the invention to arrange the nozzle so that all of the mixing takes place within the chamber 11. The stream or cloud of subdivided particles, traveling along in the chamber 11 and in the fan 13, is in a substantially turbulent condition and I find that by spraying the liquid into the turbulent stream, the liquid being under substantial pressure as it escapes from the nozzle 25, the liquid becomes thoroughly mixed with the subdivided material to the extent that the material is actually impregnated with the liquid. It is thought that the impregnation of the subdivided material is effected by the provision of means whereby the fluid is sprayed into the turbulent cloud of subdivided material in the presence of a partial vacuum effected by the fan 13, and one of the important features of the present invention resides in the novel method of thoroughly mixing a liquid ingredient with subdivided material by injecting the liquid into the material under pressure and in the presence of a partial vacuum.

It is obvious that the present mixing method may be accomplished by means of stationary apparatus. However, for convenience, I prefer to mount the grinder 19 and the other associated apparatus on a mobile truck 27, which, in the illustrated embodiment, is shown as an automotive truck provided with an engine 29, suitable transmission devices, including a manually operable gear shift 31, being provided for drivingly connecting the engine 29 with the truck wheels 33 through the intermediary of the transmission shafts 35. The truck illustrated is of the four-wheel drive type.

The transmission mechanism also is formed so that by suitable manipulation of the gear shift 31, the engine may be disconnected from the truck wheels and connected to drive a power shaft 37, drivingly connected through suitable reduction gearing 39 to a shaft 41 on which the turnable element of the hammer mill or crusher 19 is drivingly connected. The rotatable impeller element of the blower 13 is also drivingly connected to the shaft 41 so that the engine 29 may be selectively utilized either to motivate the truck or the mixing apparatus of my present invention which is mounted on the truck.

The truck also carries a reservoir or storage tank 43 for the molasses or other liquid to be mixed with the subdivided materials in the mixing chamber 11. Since molasses is a relatively viscous liquid, especially at relatively low temperatures, I prefer to provide means for maintaining the temperature of the molasses stored in the reservoir 43 at or above a predetermined temperature at which the liquid flows freely. For this reason, I utilize the heat generated by the engine 29 to provide a means for maintaining the molasses at a desired temperature.

In the illustrated embodiment, the excess heat developed by the engine 29 is absorbed by a cooling medium circulating in a cooling system. Ordinarily I prefer to utilize water or other cooling fluid, which is circulated through a jacket around the parts of the engine which become heated during the operation of the engine and through a radiator 45, the cooling fluid being normally delivered to the engine jacket from the bottom of the reservoir by means of a pump 47 driven from the engine by means of a belt 49 or other suitable power transmission means. The cooling medium absorbs heat from the engine in passing through the jacket and is delivered into a conduit 51 and passes through a valve 53 and a connecting conduit 55 to a preferably helical coil 57 disposed in the molasses tank 43, the heated medium preferably entering the bottom of the coil and passing upwardly thereof. The upper end of the coil is connected by means of a return conduit 59 to the top of the radiator 45. The radiator 45 also is provided with manually controllable shutter means 61 in order to regulate the temperature of the cooling medium. A by-pass conduit 63 having a valve 65 is also connected directly between the conduit 51 and the conduit 59 so that the engine cooling medium may be circulated without traveling through the molasses heating coil 57 by closing the valve 63 and opening the valve 65. Means is provided for delivering molasses from the reservoir 43 to the nozzle 25 under pressure in order that the liquid ingredient may be delivered into the mixing chamber 11 as a continuous stream at uniform pressure. To this end, I provide a pump 67 having an intake 69 disposed in the bottom of the reservoir 43, which is provided with a pocket or sump 71 so that all of the molasses may be drawn from the tank through the pump 67 if necessary.

The pump 67 discharges into a conduit 73, which leads through a strainer 75, a valve 77, a meter 79 to the nozzle 25, there being a valve 81 immediately in advance of the nozzle in order to control the liquid delivery of the nozzle. A thermometer or other suitable temperature indicating device 74 and a pressure gauge 76 are arranged in the pipe 73 preferably in advance of the strainer 75 to register the temperature and pressure of the liquid in the delivery system.

The system is also provided with a valved drain outlet 83, which enters the conduit 73 at approximately the lowest part of the molasses delivery system. A by-pass conduit 85, controlled by a valve 87 and a return conduit 98 controlled by a valve 91 are also provided to permit the molasses to be circulated through the system, as when the molasses is cold without passing through the meter 79, and without discharging through the nozzle, since it is desirable to circulate the molasses for an interval through the system before starting the mixing operation in order to ensure proper mixing fluidity which may be determined at the drain outlet 83. By-pass circulation may be accomplished by closing the valves 77 and 81, and opening the valves 87 and 91. A valve 78 also is provided on the discharge side of the meter 79 to prevent back pressure from affecting the same when the liquid is by-passed as aforesaid. The return conduit 89 controlled by the valve 91 is connected between the pipe 73 on the discharge side of the meter 79 and discharges into the upper portion of the reservoir 43. A spring-actuated relief valve 93 also is connected between the conduit 89 and the conduit 73 on the discharge side of the pump 67 to maintain the molasses in the delivery line 73 below a predetermined safe operating maximum. When the system is in normal operation with valves 77, 78, and 81 open and valve 87 closed, the valve 91 may be opened to any desired degree to regulate the pressure of the molasses at the nozzle and to return to the reservoir the excess molasses not needed to maintain the desired nozzle pressure. A valve 92 also is interposed directly between the return pipe 89 and the delivery line 73, in advance of the thermometer, pressure gauge, strainer and meter, in order to provide for the further regulation of molasses pressure in the system.

I provide connections for driving the pump 67 by means of power delivered by the engine 29. In the illustrated embodiment, this is accomplished by forming a driving pulley or sprocket 95 on a shaft 97 which is drivingly connected to the engine-driven shaft 37 through the reduction gearing 39. The pulley 95 is drivingly connected as by means of the belt or chain 99 to a counter-shaft 101 provided with a pulley 103, which is belted to drive the motor 67.

In order to maintain the molasses in a substantially fluid condition in the pump and the delivery and return pipes, I prefer to enclose the pump relief valve and portions of the pipes 73 and 89 in a heat conserving housing 94, which, at its lower end, is in communication with a coil 96 formed in the return pipe 59 of the molasses heating system. Even after the circulating medium of the molasses-heating system has passed out of the coil 57, the medium contains considerable heat which is delivered by the coil 96 into the housing 94 and serves to maintain the enclosed parts in substantially warm condition. The elongated lengths of pipes 73 and 89 extending between the housing 94 and the truck panel on which the strainer 75 and meter 79 are mounted, also may be enclosed in a housing 98 which communicates with the housing 94 and serves to maintain the said pipe lengths in substantially warm condition.

It will be noted that the strainer 75 and the meter 79, and also the various control valves 77, 81, 83, 87, and 91 are all carried on a framework at the rear of the truck to facilitate manipulation of the valves, the reading of the thermometer, pressure gauge and meter, and the servicing of the strainer 75. The several elements of the apparatus also are disposed in a most convenient position on the truck, the molasses reservoir 43 being disposed immediately behind the driver's cab at the approximate center of gravity of the truck so that the molasses rides easily and the reservoir is subjected to a minimum amount of jar and stress while the truck is in transit. The grinding device is mounted on the truck behind the reservoir 43 in a readily accessible position so that by removing the cover 21 all of the parts of the grinding mechanism are exposed. The collective device 15 also is mounted on the truck at the rear thereof adjacent the meter and valves for controlling the delivery of the molasses.

The collector 15 comprises preferably a sheet metal tank, into the upper end of which is delivered the mixed feed. The lower end of the collector is formed as a substantially inverted cone, the lower end of which cone is provided with a discharge nozzle onto which a bag or other container for mixed feed may be attached, the discharge nozzle being provided with a shutter for controlling the flow of mixed feed from the container 15 into the bag.

The pump 67 has a capacity sufficient to deliver molasses into the conduit 73 at a pressure somewhat higher than that at which the relief valve 93 is set to operate. The relief valve, however, insures that a predetermined maximum safe pressure of the molasses in the conduit 73 is not exceeded. The molasses is delivered under pressure through the pipe 73, the strainer 75, and the meter 79 to the nozzle, the valves 77 and 78 being open and the valves 87 and 83 being closed. By manipulating the valves 91 and 92, a part of the liquid molasses discharged from the meter 79 may be returned back to the reservoir in order to regulate the amount of molasses delivered to the nozzle and also to accomplish a control of the delivery pressure of the molasses supplied to the nozzle.

A further control of the molasses actually ejected at the nozzle may be accomplished by means of the valve 81. If, for any reason, the ground material delivered by the grinder through the mixing chamber 11 and the blower 13 should fail, the operator may immediately close the valve 81 and prevent the mixing device from becoming flooded with molasses. In any event, the excess molasses delivered by the pump 67 to the system is returned to the reservoir through the pump 89.

By closing valves 77 and 78 and valve 81, and opening valve 87, circulation of the liquid may be had in the system without passing the meter. This is desirable when the system is being placed in operation in cold weather when the molasses, standing in the exposed pipes, may be too viscous to immediately pass through the meter and nozzle. A few minutes of circulation through the warm tank 43 will make the molasses sufficiently fluid for use.

It is, of course, entirely practical to operate my mixing device without employing a grinder 19 by previously grinding the solid ingredients to proper size and introducing them into the mixing chamber. However, I prefer to employ a grinder not only to insure that the ground material is delivered at a uniform rate into the mixing chamber but also to permit unground materials to be dumped into the mixing machine, and I provide means operatively associated with the grinder whereby various solid ingredients may be loaded into bins and delivered in mixed condition into the grinder so that any desired formula employing desired mixtures of ground materials may be produced by the grinding apparatus. To this end, I provide a plurality of bins 105, which may be conveniently mounted on the frame of the truck on one side while a corn sheller 107 is mounted on the truck frame on the other side of the truck. Each of the bins 105 may contain a desired supplemental food ingredient, such as dry buttermilk, alfalfa, phosphorus, charcoal, bone meal, and other ingredients in ground condition and measured quantities of each ingredient may be released from each bin into a chute 109, which discharges into a worm conveyor 111, the worm of which is driven by the control shaft 101 heretofore mentioned. The conveyor 111 operates not only to convey the supplemental ingredients, delivered from the bins 105, to the grinder, but also serves to thoroughly mix the ingredients together. The conveyor 111 discharges into a chute 113 which delivers the mixed ingredients either directly into the grinder or into the chute 115 which leads to the grinder. In any event, the supplemental ingredients are mixed with the principal ingredients, introduced directly into the chute 115, as all of the solid ingredients are fed to the grinder. If desired, a supplemental supply of cod liver oil or similar ingredient to be mixed, in minimal quantities, may be added to the dry ingredients from a drip reservoir 116 mounted on the grinder casing.

The corn sheller 107 is a device of known construction comprising mechanism for receiving corn on the cob and removing the kernels of grain.

The sheller comprises a chute 117 into which the material to be treated is dumped, the chute leading to a casing 118 containing the beaters which perform the shelling operation. The beaters are driven by a shaft 119, which is drivingly connected by means of the chain or belt 121 to a driving pulley 123 on the shaft 97. The sheller also incorporates a worm conveyor 125 into which the shelled grain is delivered at the bottom of the casing 116. The worm of the conveyor is drivingly connected to the shaft 119 by means of the belt 127 and serves to deliver the shelled material into a chute 129 discharging into the grinder.

Among the numerous advantages of my present mixing apparatus is the unusually thorough mixing of the liquid and subdivided solid food ingredients, which is accomplished by spraying the liquid ingredient into a turbulent cloud of the subdivided solid ingredients.

Another advantage resides in the neat and compact arrangement of the parts upon the truck whereby the grinding device is rendered mobile and capable of traveling to the most convenient place for carrying out the grinding and mixing operation.

Another advantage resides in having the devices for controlling the relative quantity of the auxiliary ingredients mounted directly upon the truck in unusually compact, yet readily accessible position whereby feeds of any desired composition can be created.

The apparatus also may be regulated to perform the grinding and mixing operation as a continuous operation which is a distinct advantage over methods involving the mixing of the ingredients in batches so that the relative proportion of the various ingredients, unless very accurately controlled, is different in every batch mixed.

Another feature resides in utilizing the heat generated by the power plant of the truck directly for maintaining the molasses in a suitable fluid condition.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages, the form herein described being a preferred embodiment for the purpose of illustrating my invention.

Having thus described the invention, what I claim as new and desire to secure by Letters Patent is as follows:

1. Mixing apparatus comprising means forming a conduit, means to deliver a cloud of subdivided material through the conduit, pressure spray means located entirely outside of the conduit and adapted to deliver a liquid spray into the conduit through an opening therein in position to mix with and impregnate the subdivided material, said conduit having a bend and being of substantially uniform cross section at said bend, and said spray means and conduit opening being located at said bend and positioned to direct the liquid spray longitudinally through a portion of the conduit extending beyond said bend.

2. Mixing apparatus comprising a centrifugal blower having an inclosing casing and a rotor, an inclosed inlet conduit terminating in a portion substantially coaxial with the rotor axis, means for delivering subdivided material through the inlet conduit, pressure spray means for introducing a liquid spray into the material, said spray means being positioned to direct the spray into the conduit coaxially of the terminal portion directly toward the rotor at the center whereby to introduce the liquid into the subdivided material at a point of maximum vacuum and turbulence, and an exhaust passageway leading peripherally from the blower casing.

3. Mixing apparatus comprising a centrifugal blower having an inclosing casing and a rotor, an inclosed inlet conduit leading to the blower, said conduit having a bend adjacent its delivery end terminating in a portion coaxial with the rotor axis, means for delivering subdivided material through the inlet conduit, pressure spray means for introducing a liquid spray into the material, said spray means being positioned outside of the conduit at the conduit bend and arranged to direct the spray through an opening in the conduit coaxially of the conduit terminal portion directly toward the rotor at the center, whereby to introduce the liquid uniformly into the subdivided material at a point of maximum vacuum and turbulence, and an exhaust passageway leading peripherally from the blower casing.

ELIAS G. MYERS.